Figure 1:
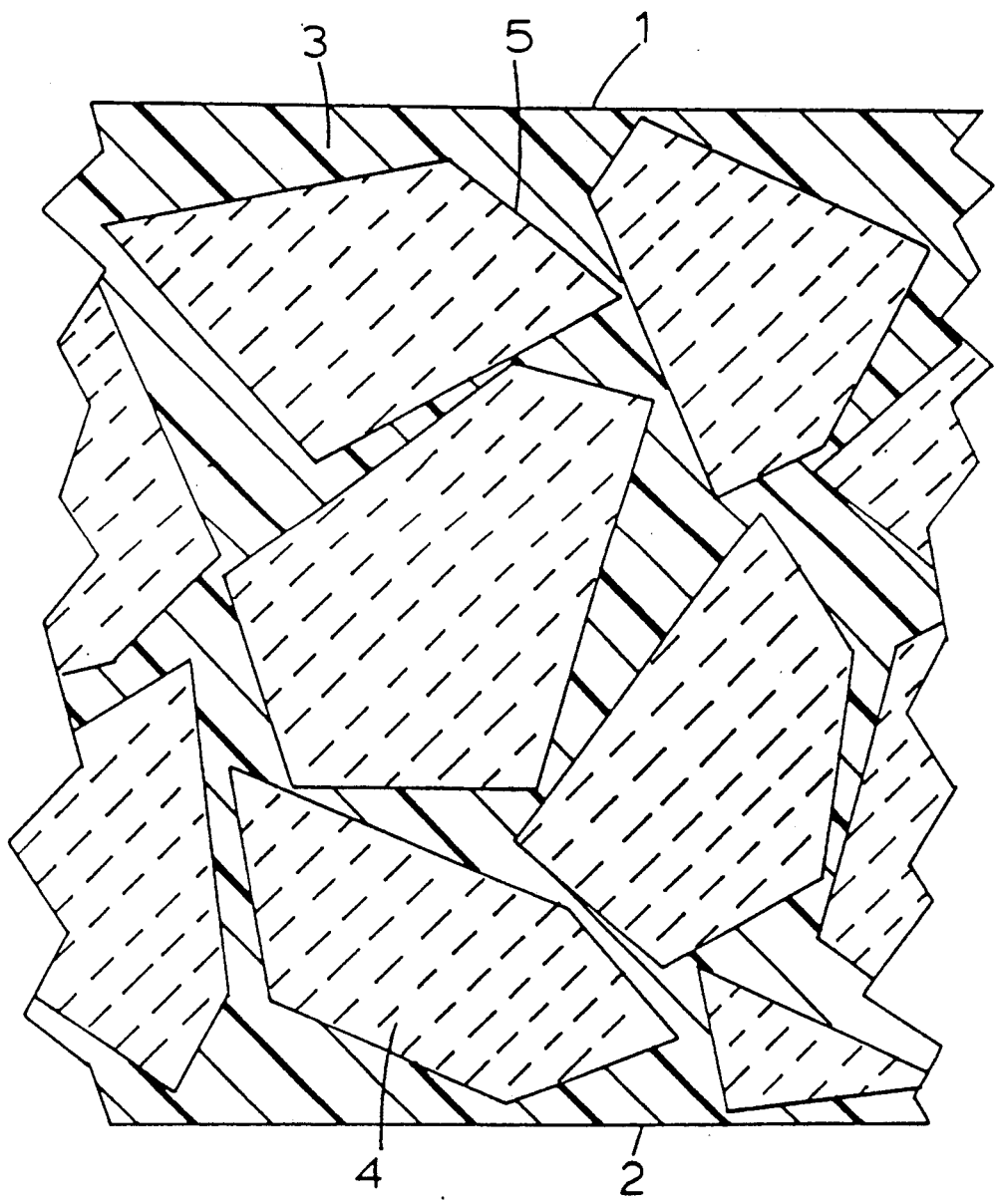

United States Patent [19]
Neefe

[11] Patent Number: 5,100,603
[45] Date of Patent: * Mar. 31, 1992

[54] METHOD OF RECYCLING MULTIMATERIAL CONTAINERS

[76] Inventor: Charles W. Neefe, P.O. Box 580, Angel Fire, N. Mex. 87710

[*] Notice: The portion of the term of this patent subsequent to Mar. 5, 2008 has been disclaimed.

[21] Appl. No.: 674,773

[22] Filed: Mar. 25, 1991

Related U.S. Application Data

[63] Continuation-in-part of Ser. No. 624,660, Dec. 10, 1990, Pat. No. 5,041,250, which is a continuation-in-part of Ser. No. 516,354, Apr. 30, 1990, Pat. No. 4,997,609.

[51] Int. Cl.$^5$ .............................................. B29C 43/02
[52] U.S. Cl. ................................... 264/115; 264/122; 264/DIG. 69
[58] Field of Search ................ 264/122, 115, 126, 37, 264/DIG. 69, 125, 129

[56] References Cited

U.S. PATENT DOCUMENTS

| | | | |
|---|---|---|---|
| 3,671,615 | 6/1972 | Price | 264/122 |
| 3,804,935 | 4/1974 | Potter et al. | 264/122 |
| 3,806,562 | 4/1974 | Lamort et al. | 264/115 |
| 3,897,527 | 7/1975 | Ringdal | 264/37 |
| 3,956,541 | 5/1976 | Pringle | 264/122 |
| 4,028,288 | 6/1977 | Turner | 264/109 |
| 4,115,497 | 9/1978 | Halmo et al. | 264/115 |
| 4,187,352 | 2/1980 | Klobbie | 521/79 |
| 4,225,640 | 9/1980 | Erb | 264/122 |
| 4,279,790 | 7/1981 | Nakajima | 264/122 |
| 4,427,818 | 1/1984 | Prusinski | 524/442 |
| 4,681,719 | 7/1987 | Vogel | 264/122 |
| 4,874,095 | 10/1989 | Warych | 264/DIG. 69 |
| 4,968,463 | 11/1990 | Levasseur | 264/40.1 |
| 4,970,043 | 11/1990 | Doan et al. | 264/237 |
| 4,997,609 | 5/1991 | Neefe | 264/122 |

Primary Examiner—Mary Lynn Theisen

[57] ABSTRACT

Multimaterial containers are composed of layers of different materials. Plastic containers are each composed of single resin material. These containers may be granulated and mixed together, heated and moulded, to form new and useful objects. The containers with residue inside and labels outside are granulated to form a material resembling multicolored sawdust. A small amount of sugar is added and the mixture is placed in a mould. Heat is applied to caramelize the sugar and melt the granulated plastic encasing the multilayer particles within the plastic melt. Pressure is applied to remove air from the mould cavity. The mould and contents are cooled and the useful object removed from the mould.

12 Claims, 1 Drawing Sheet

METHOD OF RECYCLING MULTIMATERIAL CONTAINERS

This is a continuation-in-part of application Ser. No. 07/624,660 filed Dec. 10, 1990, now U.S. Pat. No. 5,041,250, entitled "Polymer Bonding Grains of Sand Using Styrofoam Fluff as an Adhesive" which is a continuation-in-part of Ser. No. 07/516,354 filed Apr. 30, 1990, now U.S. Pat. No. 4,997,609 issued Mar. 5, 1991.

Polymer usage has increased yearly for the past fifty years. The new types of polymers available have also increased. New polymers are introduced in the market each year; these new plastics have different physical and chemical characteristics such as melt temperature, hardness and solubility. The reuse of this multitude of plastic materials having widely different physical and chemical properties is most difficult. The separation of polymer types is impossible by visual inspection. Some polyethylene, polyacrylonitrile, polystryene, polyesters and polypropylene look and feel much the same, but may have widely different melt temperatures. High density and low density polyethylene have greatly different properties. Removing labels from containers is also an economically impossible task. Containers are also made of layers of different materials.

IN THE DRAWINGS

FIG. 1 shows the polymer mixture in section.

SUBJECT OF THE INVENTION

A method has been developed whereby empty polymer containers can be granulated, mixed with shredded or granulated multimaterial containers and reused to make useful objects without sorting, removing labels or cleaning the containers.

TYPES OF POLYMERS USED

The most important plastics obtained by direct polymerization are also those which are the most important in terms of production volume, namely the polyolefins, the vinyl chloride polymers and the styrene polymers. These three polymers account for about 67% (polyolefins 33%, vinyl chloride polymers 20% and styrene polymers 14%) of the total annual plastics production in the West. The most important polyolefins are the polyethylenes and polypropylenes.

Thermoplastics are plastics which soften when heated but harden again when they are cooled, and this allows them to be shaped very easily. Softening and rehardening does not significantly alter the properties of a thermoplastic. As it is heated a thermoplastic first becomes elastic, like rubber, and then completely plastic, like a very viscous liquid.

Extrusion moulding, carried out in an extruder, is a common method of shaping thermoplastics. An extruder consists of a heated pressure-resistant barrel in which there is a helical screw, as in a domestic mincer (meat-grinder). The screw conveys granules of the plastic through a heated die at a temperature of about 200° C. (392° F.) and a pressure of from 100 to 300 bar (1450 to 4350 psi). A wide variety of differently shaped products can be made by this method, depending on the shape of the die aperture. If it is circular, rods or filaments are produced; if it is annular, pipes and tubes are formed; and if it is a slit, plastic sheeting or film will be produced.

The continuous products emerging from the extruder die are cooled by air, water, cooled rollers or by contact with cooled metal surfaces which give the final exact shape to the section. The finished product is then rolled up or cut into suitable lengths.

Injection moulding is one of the most important methods of producing shaped articles in large numbers. As in an extruder, the plastic is softened by being passed along a heated barrel by means of a screw. However, the screw has the additional function of a ram, which injects the softened plastic very rapidly into a cooled steel mould at temperatures of from about 180° to 300° C. (336° to 572° F.) and pressures of 1000 bar (14,500 psi) or more. After cooling, the mould opens and the article is removed.

Blow moulding is a process used to manufacture hollow articles with small openings such as bottles, cans, drums, tanks and toys. A piece of softened plastics (frequently polyethylene) tubing is extruded and introduced into a two-piece blow-mould. As the mould closed it presses one end of the tubular section together to seal it. Compressed air is blown into the other end of the tube until it fits against the cooled mould and solidifies. The mould is then opened and the article is removed.

Thermoforming is a process for making shaped articles such as bowls or beakers from plastic sheeting or film. The sheeting or film is heated with infra-red radiation to a temperature of between 120° and 180° C. (248° to 356° F.) until it is soft. It is then sucked against single-section mould by applying a vacuum. After cooling (solidifying), the moulded article is separated from the remainder of the sheet.

In rotational moulding, plastics powder is placed in a heated hollow mould of metal, and the latter is rotated slowly about two axes which are perpendicular to each other. In this way the powder melts and is distributed evenly over the whole inner surface of the mould. After cooling, the mould is opened and the moulded hollow article is removed.

Thermosetting resins may also be used in quantities found in plastic containers. Thermosetting plastics are not commonly used for packaging due to the high cost of fabrication. The small quantities used are welcomed in the granulated mix.

Resins such as polyethylene have a stable molecular structure and survive many years under severe atmospheric conditions. This fact makes them useful for many outdoor applications such as boat docks and fence posts.

TYPICAL MULTIMATERIAL CONTAINERS

In 1989 the drink box won an industry award as the most significant food-science innovation of the past 50 years. A year later it was banned in Maine. Perhaps no product has received as much attention lately from environmental critics as the drink box, the little juice container that comes with its own straw. Introduced in the U.S. in 1983, it's now a regular in school lunch boxes, with more than three billion sold annually in the U.S. and sales expanding at 10% to 20% a year.

The six-layer, plastic-metal-paper construction makes the boxes tricky to recycle. They also resist biodegrading. Unfavorable economics have hindered recycling of many multimaterial containers, from frozen food packages and drink boxes to milk cartons made with plastic-coated paperboard. Collecting and hauling them can be costly because they tend to be light and bulky. Separating their materials adds to costs. Maine banned the sale of most drink boxes, maintaining that the boxes undercut the state's recycling goals.

The soft drink box is the most innovative of the multimaterial containers. A typical drink box consists of an inner layer of polyethylene which provides an inert food contact surface, preventing spoilage, contamination or leakage. A second layer of polyethylene serves as a bonding material. The third layer of aluminum foil forms a barrier against light and oxygen to prevent spoilage and change in taste or color. The fourth layer is polyethylene and serves as a bonding material. The fifth layer is paper to provide body, stiffness and physical strength. The sixth outer layer is polyethylene for water resistance and for the label graphics. Frozen food and milk containers are of simpler construction usually of three to four layers. The complexity of separating these bonded layers is understandable.

Using the process of the invention the containers are granulated and sacked for storage and shipping, thereby greatly reducing the bulk and storage cost.

THE INVENTION IS CARRIED OUT AS FOLLOWS

Multimaterial layered containers with labels in place and residue in the containers are cut and reduced to small bits resembling confetti. Sugar is added in amounts of from 0.05% to 5.0% sugar by weight and allowed to form a coating on the individual pieces of multilayer material.

Sucrose occurs in sugar cane, sugar beet, maple sugar and honey. It is one of the most widely produced and utilized of all organic compounds. The average American manages to eat his own weight is sucrose every year. The formula for sucrose is $C_{12}H_{22}O_{11}$. Sucrose melts at 160° C. When heated to 200° C., it begins to decompose, slowly losing water leaving a brown soluble mass called caramel. The sugar may be in several forms; finely divided raw or refined sugar, also syrup may be used. The multilayered particles (4 FIG. 1) are surface coated with sugar (5 FIG. 1). The sugar coated multilayered particles (4 FIG. 1) are mixed with the granulated plastics 50% by weight. The mixture of multilayered particles and resin particles are placed in a mould and heated to 160° to 300° C. At a temperature of 160° C. the sugar begins to melt; at 225° C. the sugar is caramelizing and forming a dark, hard substance and the plastic granules are beginning to melt. Pressure is applied to the heated mixture to remove air from within the mould cavity. The multilayer particles (4 FIG. 1) are encased within the resins (3 FIG. 1) and the caramelized sugar coating (5 FIG. 1) allows the resins (3 FIG. 1) to strongly adhere to the multilayered particles. (4 FIG. 1), the melted resins bond to form a strong two phase reinforced material. Sugar coated multilayered particles and granulated resins have been mixed in amounts from 10% to 75% granulated resins by weight. The surfaces (1 and 2 FIG. 1) are smooth as formed by the inner surface of the mould cavity. The thus formed object is allowed to cool and is removed from the mould. Sand as disclosed in U.S. Pat. No. 4,997,609 maybe added to increase the weight of the moulded object.

Suggested uses of the material are railroad crossties, boat docks and fence posts. The material can be sawed, drilled and nails hold with great strength.

The added sugar may be omitted from the multilayered particles with a resulting reduction in the physical strength of the moulded member. When cost is of importance added sugar maybe eliminated as sugar is always present in both resin and multilayered container residues.

I claim:

1. A method of recycling laminated multimaterial used containers to make a useful object by the steps of: cutting the laminated multimaterial containers into granules, mixing the granulated multimaterial with sugar, providing granulated resins, mixing the multimaterial container granules with the resin granules, placing the mixture of granules in a mould, heating the mixture to caramelize the sugar, further heating the mixture until the resin granules melt encasing the multimaterial granules, allowing the resins to cool and removing the useful object from the mould.

2. A method of making useful objects by recycling used layered multimaterial containers, with labels in place on the containers and sugar containing residue in the containers by the steps of: cutting the multimaterial containers into particles resembling confetti, providing granules of resin, mixing the resin granules with the multimaterial particles, heating the mixed particles and granules, allowing the sugar containing residue to caramelize, allowing the resin to melt and encase the multimaterial particles, and allowing the resin to cool to form a useful object.

3. A method as in claim 1 wherein the multimaterial containers have layers of polyethylene, paper and aluminum.

4. A method as in claim 2 wherein the multimaterial containers have layers of polyethylene, paper and aluminum.

5. A method as in claim 1 wherein the multimaterial containers have layers of polyethylene and paper.

6. A method as in claim 2 wherein the multimaterial containers have layers of polyethylene and paper.

7. A method as in claim 1 wherein multimaterial containers have residue in them and labels on them that are not removed prior to cutting.

8. A method as in claim 1 wherein the resin granules are present in the amounts of from 10% to 75% by weight.

9. A method as in claim 1 wherein sugar is added to the multimaterial granules in the amount of from 0.05% to 5.0% by weight.

10. A method as in claim 2 wherein sugar is added to the multimaterial granules in the amount of from 0.05% to 5.0% by weight.

11. A method as in claim 1 wherein the resin and multimaterial particles are heated to from 160° C. to 300° C.

12. A method as in claim 2 wherein the resin and multimaterial particles are heated to from 160° C. to 300° C.

* * * * *